United States Patent
Sunaga et al.

[11] Patent Number: 6,009,934
[45] Date of Patent: Jan. 4, 2000

[54] ELECTRONIC CLIMATE CONTROL SYSTEM FOR AUTOMOTIVE VEHICLES

[75] Inventors: Hideki Sunaga, Azuma; Masatoshi Suto, Sano, both of Japan

[73] Assignee: Calsonic Corporation, Tokyo, Japan

[21] Appl. No.: 08/741,510

[22] Filed: Oct. 31, 1996

[51] Int. Cl.⁷ .................................................. B60H 3/00
[52] U.S. Cl. ........................ 165/42; 165/43; 454/121; 454/156; 62/244
[58] Field of Search .................... 165/42, 43, 41; 137/628, 630.15; 454/121, 156; 62/244

[56] References Cited

U.S. PATENT DOCUMENTS

| | | | |
|---|---|---|---|
| 4,362,268 | 12/1982 | Shimada et al. | 165/43 |
| 4,364,429 | 12/1982 | Nakamura et al. | 165/43 |
| 4,365,663 | 12/1982 | Inoue et al. | 165/43 |
| 4,383,574 | 5/1983 | Yoshioka | 165/43 |
| 4,407,354 | 10/1983 | Takishita et al. | 165/42 |
| 4,427,056 | 1/1984 | Johnson et al. | 165/42 |
| 4,513,808 | 4/1985 | Ito et al. | 165/43 |
| 4,702,307 | 10/1987 | Ito et al. | 165/42 |
| 4,828,018 | 5/1989 | Hoffman | 165/42 |
| 4,852,639 | 8/1989 | Horiguchi et al. | 165/42 |
| 5,016,815 | 5/1991 | Doi | 236/49.3 |
| 5,152,335 | 10/1992 | Doi | 165/24 |
| 5,220,805 | 6/1993 | Fukudomi | 62/126 |
| 5,626,186 | 5/1997 | Honda et al. | 165/43 |
| 5,755,282 | 5/1998 | Teshima | 165/202 |

Primary Examiner—Ira S. Lazarus
Assistant Examiner—Terrell McKinnon
Attorney, Agent, or Firm—Foley & Lardner

[57] ABSTRACT

An electronic climate control system for an automotive vehicle comprises a by-pass passage for delivering cool air flowing through an evaporator core directly to discharged-air ventilators, a by-pass door provided at a communication inlet of the by-pass passage for adjusting a flow rate of cool air through the by-pass passage, a hot-water valve provided for adjusting a flow rate of hot coolant to a heater core, and an actuator being common to the by-pass door and the hot-water valve for adjusting a bypass-door opening and a water-valve opening. The actuator acts to fully close the water valve when the by-pass door is fully opened. Also provided are a climate control panel for selecting one of discharged-air outlet modes, a by-pass PBR for monitoring the bypass-door opening, and a control unit for limiting the bypass-door opening to a value less than a maximum opening equivalent to a full-open position of the by-pass door when a predetermined discharged-air outlet mode except VENT mode is selected by the control panel.

10 Claims, 5 Drawing Sheets

ELECTRONIC CLIMATE CONTROL SYSTEM FOR AUTOMOTIVE VEHICLES

BACKGROUND OF THE INVENTION

1. Field of the Invention

The present invention relates to an electronic climate control system suitable for use in automotive vehicles, and specifically to an electronic climate control system for an air conditioner with a by-pass door through which cooler air conditioner system air is directed to instrument panel/dash air ducts or discharge outlets, and an actuator serving to open or close a hot-water valve as well as the by-pass door.

2. Description of the Prior Art

Figure 5:
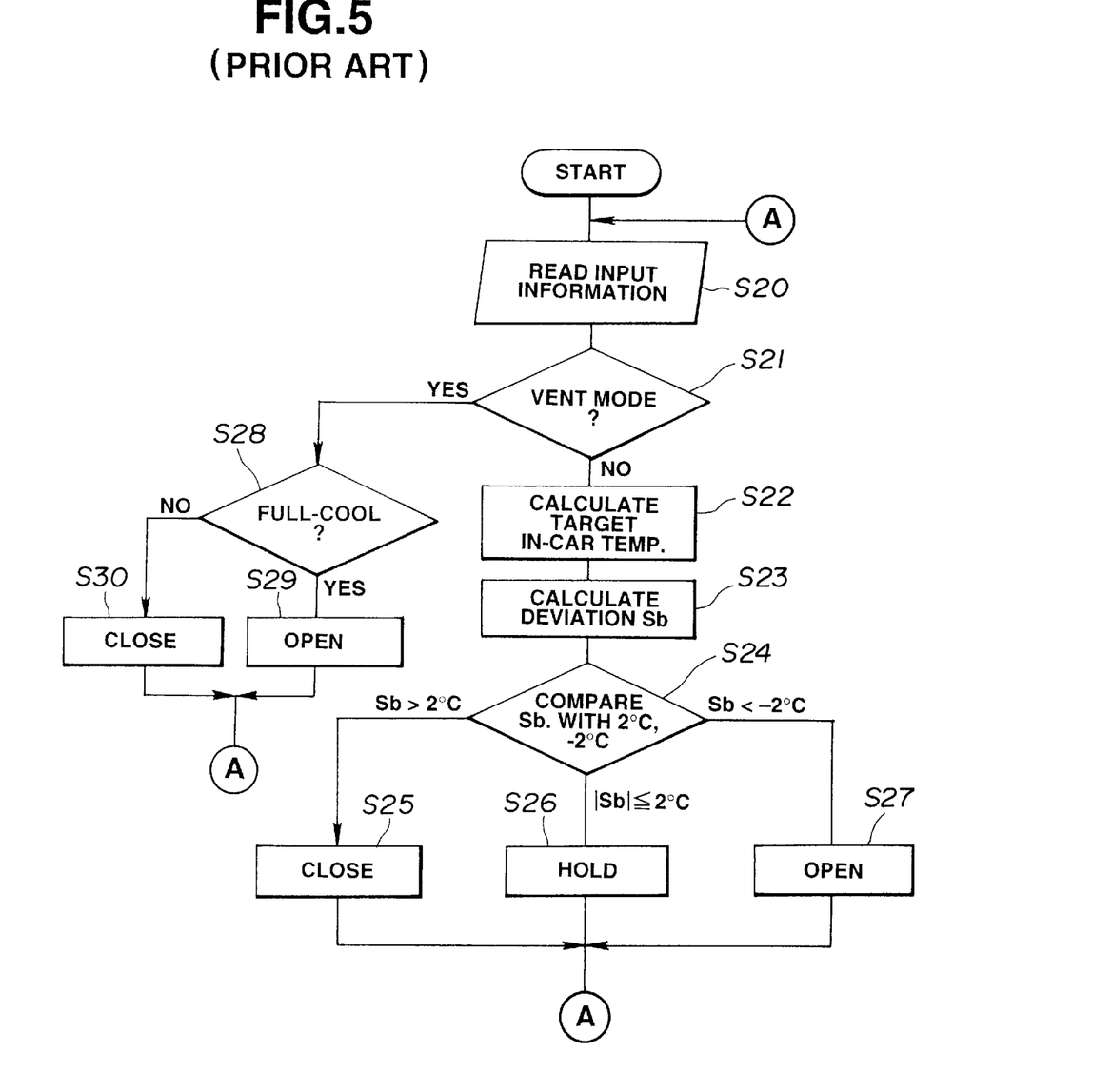
FIG. 5 is a flow chart illustrating a by-pass door control routine executed by the prior art electronic climate control system.

In recent years, there have been proposed and developed various automated electronic climate control systems that control the heating, ventilation, and air conditioning systems within the passenger compartment. On modern automobiles, the mechanic/technician in the field have made efforts to provide a more complete bi-level mode. To ensure the more complete bi-level mode, the today's motorcar often employs a by-pass passage that is capable of delivering cool air flowing through an evaporator core directly to instrument panel/dash air ducts or discharge outlets such as side vents and center vents. The use of such a by-pass passage can ensure a forcible discharge of cool air through the by-pass passage to the discharge outlets with a by-pass door (usually provided at the outlet of the by-pass passage) opened. For the purpose of reducing the number of parts constructing an automobile air conditioner, the opening or closing action of the by-pass door and the opening or closing action of a hot-water valve (or a hot-coolant flow control valve that controls the engine coolant flow through a heat-exchanger core) are both done by means of a single actuator mechanically linked to both the by-pass door assembly and the hot-water valve unit. Usually, the single actuator is designed to fully close the hot-water valve when the by-pass door is fully opened. Referring to FIG. 5, there is shown a typical by-pass door opening/closing procedure programmed into a prior art electronic climate control system. In accordance with the by-pass door control procedure shown in FIG. 5, in step S20, Input information is read. The input information comprises various parameters such as a discharged-air outlet mode (simply discharge mode) selected by a mode select switch, a set in-car temperature selected by a vehicle occupant by rotating or sliding a temperature selector switch or dial, an in-car temperature (or a room temperature in the vehicular cabin), an outside (ambient) air temperature, an amount of insolation (or a sunload temperature), a current value of an opening of the by-pass door, a current value of an opening of an air-mix door, and the like. Thereafter, in step S21, a test is made to determine whether a mode-selection switch is positioned in a VENT mode. When step 21 determines the VENT mode, step S28 proceeds in which a test is made to determine if a so-called full-cool mode is selected. When the answer to step S28 is affirmative (YES), step S29 enters in which a by-pass door is fully opened to direct cool air leaving the evaporator core via the by-pass passage to plural ventilator ducts or nozzles. Conversely, when the answer to step S28 is negative (NO), step S30 enters in which the by-pass door is fully closed to block cool-air flow through the by-pass passage. In case of any operational mode (e.g. a DEFROST mode or FOOT mode) except the VENT mode, a target in-car temperature and a temperature deviation Sb between the target in-car temperature and a temperature of actual discharged air are both calculated in accordance with predetermined expressions respectively at steps S22 and S23. Thereafter, through a decision diamond S24, the opening or closing action of the by-pass door is controlled on the basis of the temperature deviation Sb. Concretely, in step S24, a test is made to determine whether the temperature deviation Sb (obtained through step S23) is greater than a predetermined upper threshold such as +2° C., or less than a predetermined lower threshold such as −2° C., or the temperature deviation Sb is within a deviation ranging from the predetermined lower threshold to the predetermined upper threshold. In case of Sb>+2° C., that is, when the in-car temperature sensed is less than the target in-car temperature, step S25 proceeds in which the bypass door is shifted towards its closed position. In case of $|Sb| \leq 2°$ C., ($-2°$ C.$\leq Sb \leq +2°$ C.), that is, when the in-car temperature sensed is almost equivalent to the target in-car temperature, step S26 proceeds in which the angular position of the by-pass door is maintained unchanged. In case of Sb<−2° C., that is, when the in-car temperature sensed exceeds the target in-car temperature, step S27 proceeds in which the by-pass door is shifted towards its full-open position. The routine shown in FIG. 5 is repeatedly executed as time-triggered interrupt routines to be triggered every predetermined sampling time intervals, so as to control the discharged-air temperature towards the target in-car temperature. According to the by-pass door control procedure of FIG. 5, under a particular condition that a value of the deviation Sb continues to be below the lower threshold (e.g. −2° C.), the by-pass door also continues to shift towards its full-open position. In such a case, in the event that the air conditioning system employs a single actuator connected to both a linkage of the hot-water valve and a linkage connected to the by-pass door for opening or closing action of the hot-water valve as well as the by-pass door, the hot-water valve remains closed with the by-pass door continuously kept at its full-open position, thereby shutting off hot-water supply into the heater core for a while. However, during the actual driving, the driver or vehicle occupant will often require any warm-air flow within towards the passenger compartment such as front foot vents or rear foot vents, under the previously-noted particular condition (with the by-pass door maintained at its full-open position for a while). For example, in case of a so-called BI-LEVEL mode at which the driver/passenger requires both cool-air flow through face ventilator ducts or nozzles (such as center ventilator ducts and side ventilator nozzles) and warm-air flow through foot vents (or floor outlets), it is unpreferable to shift to the fully-closed position of the hot-water valve in synchronization with shifting of the by-pass door to its full-open position. Similarly in case of a so-called DEFROST mode, it is required to provide both warm-air flow through defrost outlets such as side defroster dusts and front defroster nozzles and cold-air flow through ventilator ducts or nozzles, for the purpose of preventing any moist air from clouding the windshield and of preventing breath humidity from the driver or passengers and of removing moisture within the passenger compartment. As set forth above, according to the by-pass door control procedure of FIG. 5, since the hot-water valve is fully closed while the by-pass door is held in the full-open position, the system cannot provide a desired warm air flow from the foot vents or defroster ducts or nozzles for example in the BI-LEVEL mode and the DEFROST mode. That is to say, the conventional system as shown in FIG. 5 cannot satisfactorily provide cold and warm air flows desired.

SUMMARY OF THE INVENTION

Accordingly, it is an object of the invention to provide an improved electronic climate control system for an air conditioner which avoids the foregoing disadvantages of the prior art.

It is another object of the invention to provide an electronic climate control system for an air conditioner with a single bypass door actuator which is common to a by-pass door and a hot-water valve for their opening/closing actions, which system can ensure an optimal opening/closing control of the hot-water valve as well as the by-pass door in any operational modes at which the air conditioner must provide both cold-air flow via the bypass valve from a by-pass passage and warm-air flow leaving the heater core.

In order to accomplish the aforementioned and other objects of the invention, an electronic climate control system for an automotive vehicle comprises a by-pass passage for delivering cool air flowing through an evaporator core directly to a discharged-air ventilator, a by-pass door provided at a communication inlet of the by-pass passage, for adjusting a flow rate of cool air through the by-pass passage, a hot-water valve provided for adjusting a flow rate of hot coolant to a heater core, an actuator being common to the by-pass door and the hot-water valve for adjusting a bypass-door opening and a water-valve opening, the actuator acting to fully close the water valve when the by-pass door is fully opened, switching means for selecting one of discharged-air outlet modes, detection means for monitoring the bypass-door opening, and control means for limiting the bypass-door opening to a value less than a maximum opening equivalent to a full-open position of the by-pass door when a predetermined discharged-air outlet mode is selected by the switching means.

According to another aspect of the invention, an electronic climate control system for an automotive vehicle comprises a by-pass passage for delivering cool air flowing through an evaporator core directly to a discharged-air ventilator, a by-pass door provided at a communication inlet of the by-pass passage for adjusting a flow rate of cool air through the by-pass passage, a hot-water valve provided for adjusting a flow rate of hot coolant to a heater core, an actuator being common to the by-pass door and the hot-water valve for adjusting a bypass-door opening and a water-valve opening, a drive arm of the actuator mechanically linked to both the by-pass door and the hot-water valve so that an operating range of the by-pass door is wider than an operating range of the hot-water valve, and so that the operating range of the hot-water valve is embraced in the operating range of the by-pass door, and so that the by-pass door is shifted from a fully-closed position to a full-open position when shifting from a first angular position of the drive arm to a second angular position of the drive arm and that the hot-water valve is shifted from a full-open position to a fully-closed position when shifting from a third angular position defined between the first and second angular positions to the second angular position, switching means for selecting one of discharged-air outlet modes, detection means for monitoring the bypass-door opening, and control means for limiting the bypass-door opening to a value less than a maximum opening equivalent to a full-open position of the by-pass door when a predetermined discharged-air outlet mode is selected by the switching means. The predetermined discharged-air outlet mode is an air temperature control mode based on a temperature deviation between an actual in-car temperature and a target in-car temperature, and the control means limits the bypass-door opening to prevent the bypass-door opening from reaching the maximum opening and to prevent the hot-water valve from being fully closed during the air temperature control. Preferably, the control means may include comparison means for comparing the bypass-door opening with a predetermined upper limit less than the maximum opening and for comparing the bypass-door opening with a predetermined lower limit substantially equal to a bypass-door opening equivalent to the third angular position when the deviation is less than a predetermined lower threshold, and the control means generates a command signal to the actuator to hold the bypass-door opening unchanged when the comparison means determines that the bypass-door opening is greater than the predetermined lower limit and less than the predetermined upper limit.

DESCRIPTION OF THE PREFERRED EMBODIMENTS

Figure 1:
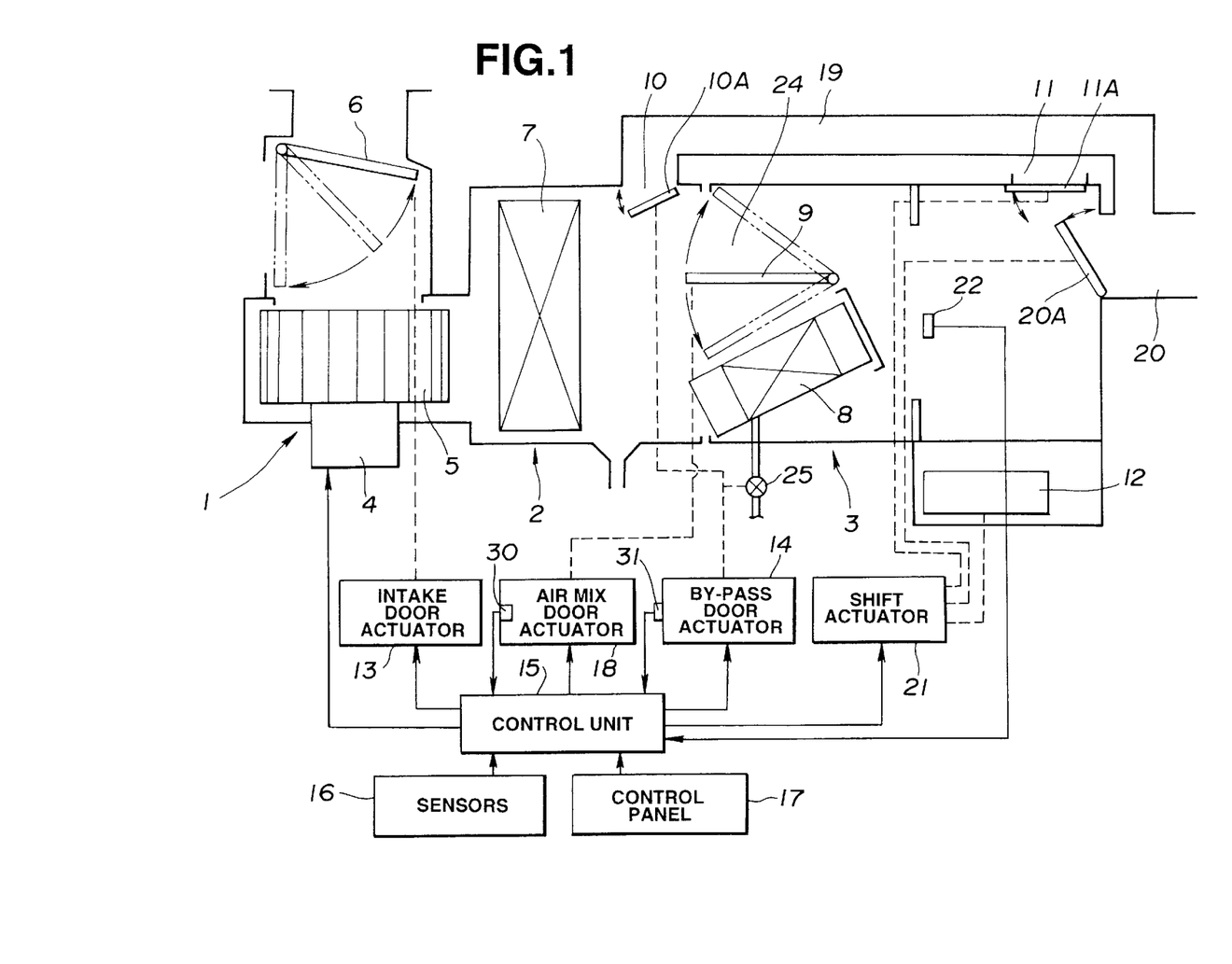
FIG. 1 is a system diagram illustrating one embodiment of an electronic climate control system for an air conditioner with a by-pass door actuator, made according to the invention.
Figure 2:
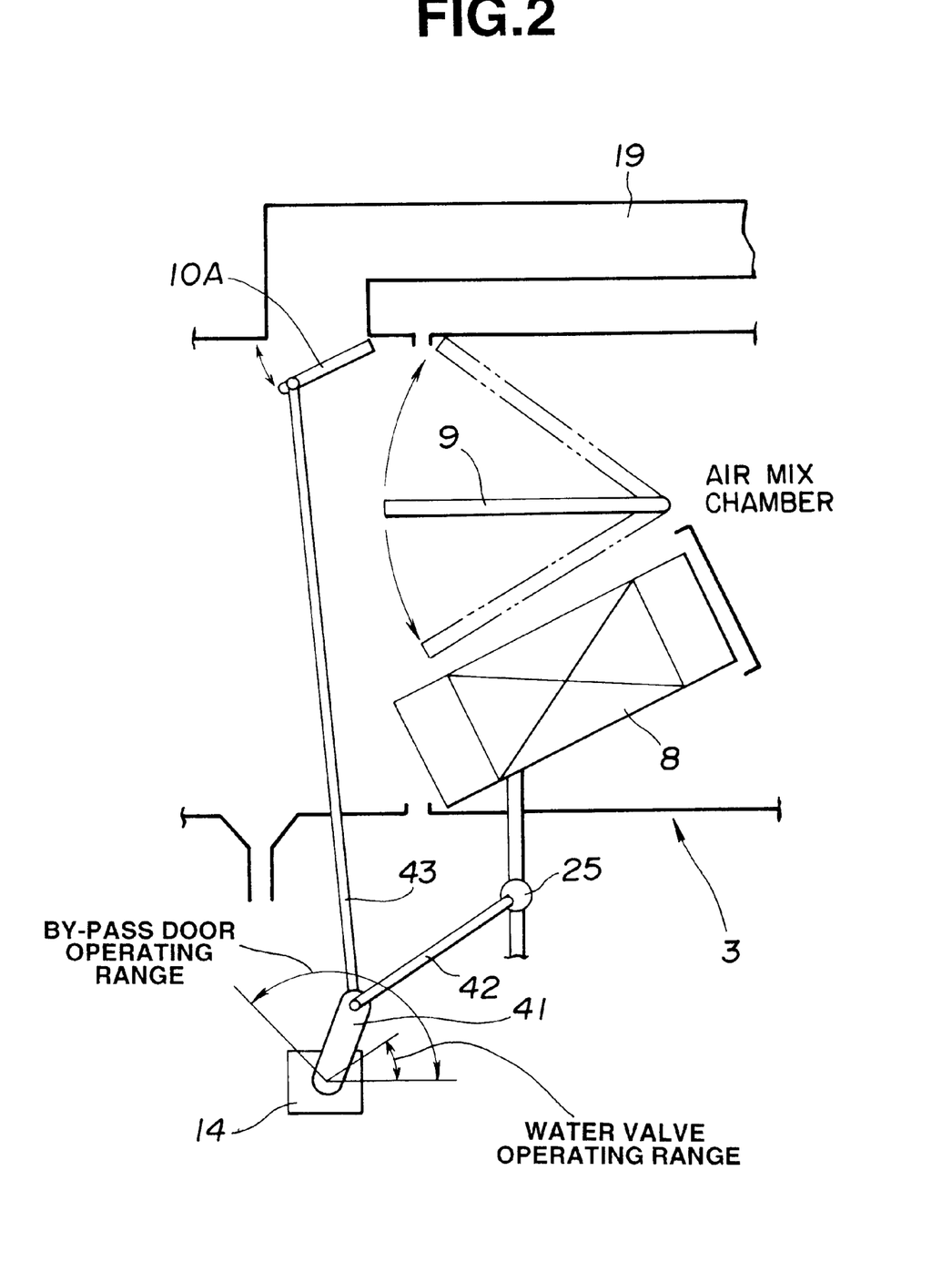
FIG. 2 is an assembled view illustrating the by-pass door actuator and its links respectively connected to the hot-water valve and the by-pass valve.
Figure 3:
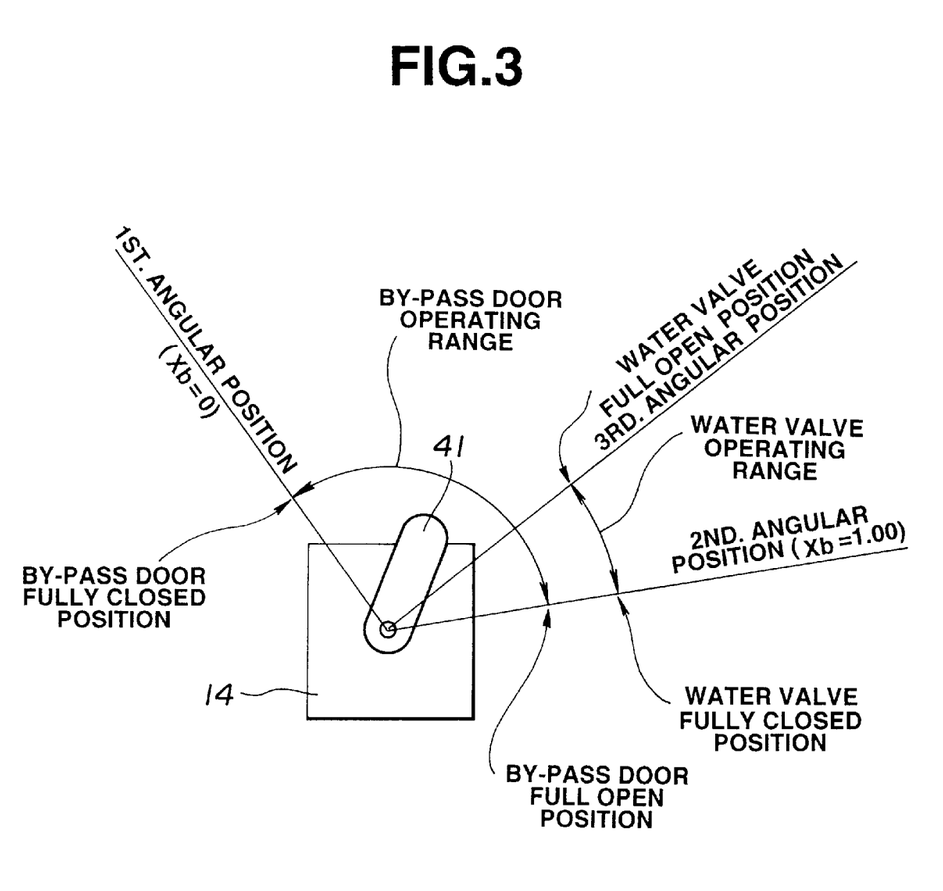
FIG. 3 is a detailed illustration of the relationship among an angular-position of the drive arm of the by-pass door actuator, an actuatable angular range of the hot-water valve and an actuatable angular range of the by-pass door.

Referring now to the drawings, particularly to FIG. 1, the electronic climate control system of the invention is exemplified in case of automotive air conditioner with a by-pass door actuator which is common to a hot-water valve as well as a by-pass door. As seen in FIG. 1, the automotive air conditioner or air conditioning system includes an air intake unit (or an air inlet assembly 1, a cooling unit 2 and a heater unit 3. The air inlet assembly 1 includes a blower fan 5 and a blower motor 4 which is connected to drive the blower fan. A recirculate/outside air mode door (or an air inlet recirculation door) 6 is provided upstream of the blower fan 5 to select one of outside air (ambient air) and inside air (recirculating air) depending on the angular position of the air mode door 6. The cooling unit 2 includes an evaporator 7 which is provided for cooling the air passing through the evaporator and for removing moisture from the air. Refrigerant circulates within the cooling system and the liquid refrigerant evaporates and cools the air by absorbing the heat from the air flowing through the evaporator core. The cooling unit 2 is formed with a cold-air duct or a cool-air duct 19 which serves as a by-pass passage for directing the cold air passing through the evaporator 7 therethrough to instrument panel/dash discharged-air ducts or vents 20. The by-pass passage 19 is formed with a communication inlet 10 at its upstream end. As seen in FIG. 1, a by-pass door 10A is provided for opening and closing the communication inlet 10. With the by-pass door 10A fully opened, any cooled air flowing through the evaporator can be supplied through the by-pass passage 19 directly to the vents 20. The heater unit 3 includes a heater core 8 within which engine coolant circulates for heating the air flowing through the heater core 8. The heater core assembly is cooperative with the inner wall of the heater-unit duct to define a cooler air passage 24 parallel to the heater core assembly. A hot-water valve 25 is provided for controlling the flow rate of engine coolant through the heater core 8. An air mix door (or an air blend door) 9 is pivotally provided in the previously-noted cooler air passage 24 for controlling the blend of evaporator core and heater core air. The air temperature-controlled and conditioned by the air mix door 9 is discharged into the passenger compartment through a plurality of discharged-air ducts or vents 11 (i.e. defrost outlets), 12 (i.e. floor outlets) and 20 (i.e. air conditioning vents including center ventilator ducts and side ventilator nozzles) integrally formed with the heater unit. A temperature sensor 22 is provided downstream of the heater core 8 for detecting a temperature of temperature-controlled air which will be discharged into the passenger compartment. A defrost door 11A is provided upstream of the defrost outlets 11 for controlling the flow rate of discharged air from the defrost outlets, whereas a vent door 20A is provided upstream of the air conditioning vents 20 for controlling the flow rate of discharged air from the vents. A climate control unit 15 is provided to achieve various controls of the air conditioner, for example a rotational speed of the blower fan 5, an opening of the air inlet recirculation door 6, an opening of the air mix door 9, an opening of the by-pass door 10A, openings of plural discharged-air ducts or vents 11, 12 and 20. Although it is not clearly shown in FIG. 1, the control unit 15 commonly includes an input interface connected to a series of sensors 16 such as an outside air temperature sensor, an inside air temperature sensor and a sunload sensor (or an insolation sensor) that senses heat load radiating into the passenger compartment, the temperature sensor 22 located downstream of the heater core for monitoring the discharged-air temperature, an air mix door potentio-balance-resistor 30 (basically corresponding to a potentiometer and abbreviated to "air-mix PBR") for monitoring an opening of the air mix door 9, a potentio-balance-resistor 31 (basically corresponding to a potentiometer variable resistance) and abbreviated to "by-pass PBR") for monitoring an opening of the by-pass door 10A, and also connected to an electronic climate control panel 17 with various buttons/dials for an in-car temperature setting and a discharge-mode setting. For instance in case of an automatic air conditioner, the control unit can automatically vary the discharged-air outlet mode on the basis of information from the plural sensors such as the inside-air temperature sensor, the outside air temperature sensor, the sunload sensor and the like, in addition to the driver-selected discharge mode signal. The climate control unit 15 functions to determine the air conditioning mode and to calculate a desired temperature of temperature-controlled, discharged air on the basis of signals received by the input interface of the climate control unit 15. Depending upon the calculated discharged air temperature and the air conditioning mode determined, the control unit 15 controls the blower motor 4 for adjustment of the rotational speed of the blower fan 5, and controls an air mix door actuator 18 for adjustment of the opening of the air mix door 9, and controls an intake door actuator 13 for adjustment of the opening of the air inlet recirculation door 6, and controls a by-pass door actuator 14 for opening/closing motion of the by-pass door 10A, and controls a shift actuator 21 for opening/closing motion of the plural ventilator doors such as the defrost door 11A, the vent door 20A and the like. Although it is not clearly shown, the air mix door actuator 18 is comprised of a motor-drive type actuator and connected to the air mix door 9 through a motor-driven linkage (not shown). In addition, the air mix door actuator 18 accommodates therein the air-mix PBR denoted by 30. Actually, the climate control unit 15 determines the opening of the air mix door 9 based on a value of voltage signal from the air-mix PBR which voltage signal is correlated to the angular position of the sliding contact of the air-mix PBR. The by-pass door actuator 14 is common to both the by-pass door 10A and the water valve 25 that serves as a shut-off valve for controlling the flow rate of engine coolant through the heater core. Similarly to the air mix door actuator 18, the by-pass door actuator 14 is comprised of a motor-drive type actuator. As seen in FIG. 2, a drive arm 41 of the by-pass door actuator 14 is connected to the water valve 25 through a first link 42 and also connected to the by-pass door 10A through a second link 43. The by-pass door actuator 14 accommodates therein the by-pass PBR denoted by 31 (see FIG. 1). Actually, the climate control unit 15 determines the opening of the by-pass door 10A based on a value of voltage signal from the by-pass PBR which voltage signal is correlated to the angular position of the sliding contact of the by-pass PBR. As shown in FIG. 3, the operating range of the by-pass door 10A is wider than that of the water valve 25 and the operating range of the water valve 25 is embraced in the operating range of the by-pass door 10A. With reference to the comparatively wider operating range of the by-pass door 10A, the anti-clockwise end of the operating range corresponds to the fully-closed position of the by-pass door, whereas the clockwise end of the operating range corresponds to the full-open position of the by-pass door. In contrast, in case of the comparatively narrower operating range of the water valve 25, the anti-clockwise end of the operating range corresponds to the full-open position of the water valve, whereas the clockwise end of the operating range corresponds to the fully-closed position of the water valve. With the previously-noted arrangement, the by-pass door 10A gradually shifts to the full-open position and thus the opening of the by-pass door increases, as the drive arm 41 of the by-pass door actuator 14 moves from the anti-clockwise end to the clockwise end. As seen in FIG. 3, The angular position of the drive arm 41, identical to the fully-closed position of the by-pass door, defines as a first angular position. The first angular position of the drive arm corresponds to a bypass-door opening Xb of "0", as will be discussed later. The angular position of the drive arm 41, identical to the full-open position of the by-pass door (or the fully-closed position of the water valve), defines as a second angular position. The second angular position of the drive arm corresponds to the bypass-door opening Xb of "1.00", as will be discussed later. The angular position of the drive arm 41, identical to the full-open position of the water valve, defines as a third angular position. The third angular position of the drive arm 41 is within the operating range of the by-pass door (between the first and second angular positions). In more detail, the third angular position (identical to the full-open position of the water valve) is an angular position equivalent to the bypass-door opening of approximately 90% slightly less than the bypass-door opening of 100% (Xb=1.00 or 2nd. angular position). As discussed later, the third angular position of the drive arm corresponds to a predetermined bypass-door opening Xb such as approximately "0.9" more preferably "0.85". In other words, within the operating range of the by-pass door 10A, when the by-pass door is moved from almost full-open (the bypass-door opening of approximately 90%) toward full-open (the bypass-door opening of 100%), the water valve 25 is shifted from full-open (the water-valve opening of 100%) toward fully closed (the water-valve opening of 0). According to the climate control system of the invention, the opening/closing motion of the bypass door 10A is more precisely controlled depending upon comparison results of the opening of the by-pass door with two predetermined thresholds for example 0.99 and 0.85, in accordance with the flow chart shown in FIG. 4.

Figure 4:
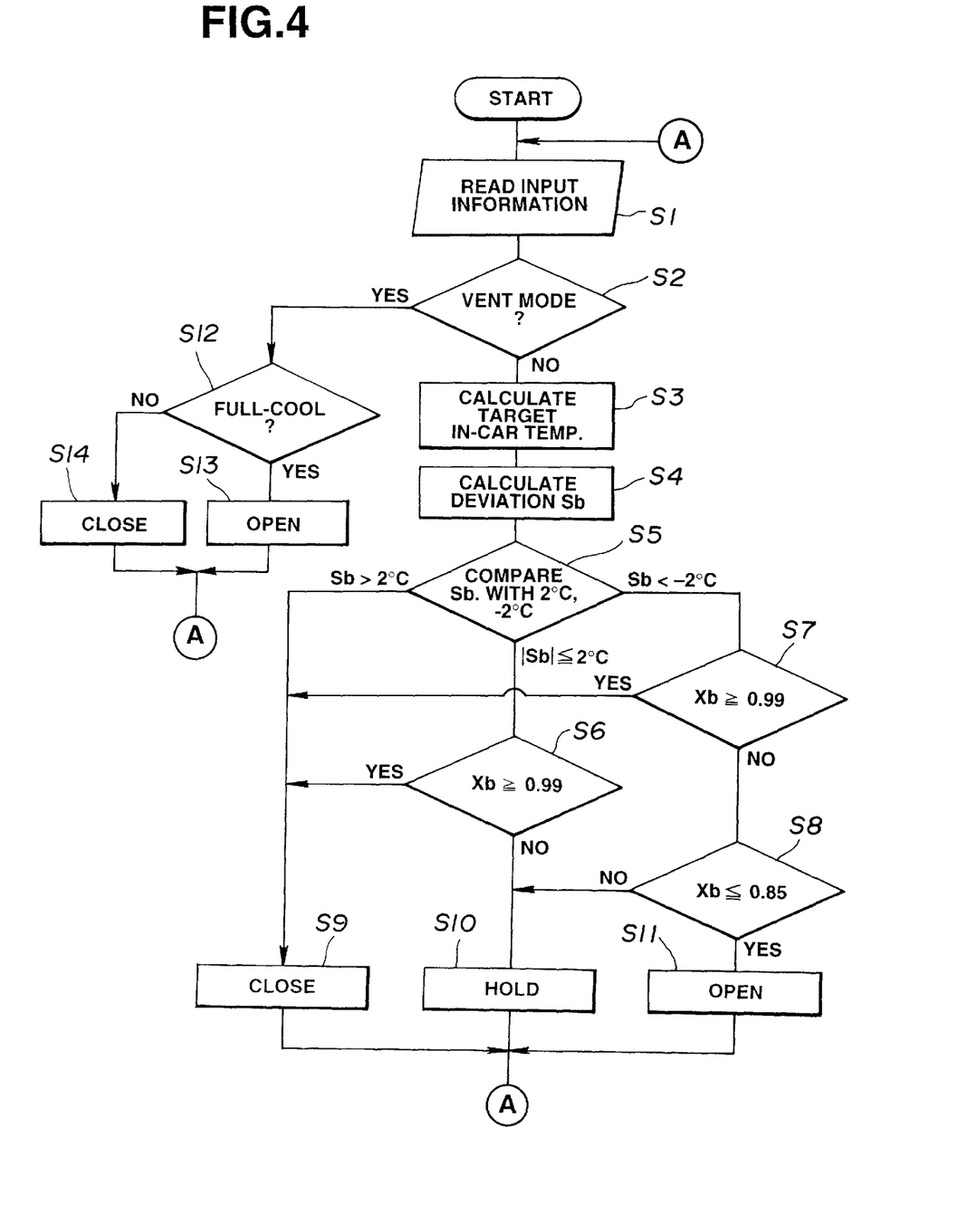
FIG. 4 is a flow chart illustrating a by-pass door control routine executed by the electronic climate control system made according to the invention.

Referring to FIG. 4, in step S1, read is input information or input data, i.e., various parameters such as sensor signals from various sensors 16 (the outside air temperature sensor, the inside air temperature sensor, and the sunload sensor), the discharged-air temperature signal from the sensor 22, the driver-selected in-car temperature signal (simply "set temperature signal") and the driver-selected discharge mode signal both selected by way of the climate control panel 17, the air-mix-door opening indicative signal Xm from the air-mix PRR 30 and the bypass-door opening indicative signal Xb from the by-pass PBR 31. In the flow chart of FIG. 4, the bypass-door opening indicative signal value Xb representative of the opening of the by-pass door and the air-mix-door opening indicative signal value Xm are defined as follows. The opening of the by-pass door 10A ranges from 0 to 1, and the bypass-door opening indicative signal value Xb of 0 is defined as a fully-closed position of the by-pass door 10A, whereas the signal value Xb of 1 is defined as a full-open position of the by-pass door. With the by-pass door 10A held at the full-open position, a full cold air flow through the by-pass passage 19 is established. With the by-pass door 10A held at the full-closed position, a cold air flow through the by-pass passage 19 is completely blocked. On the other hand, the opening of the air mix door 9 ranges from 0 to 1, and the air-mix-door opening indicative signal value Xm of 0 is defined as a fully-closed position of the air mix door 9, whereas the signal value Xm of 1 is defined as a full-open position of the air mix door 9. With the air mix door 9 held at the fully-closed position (corresponding to the lowermost position indicated by the phantom line of FIG. 1), the air mix door functions to prevent the air from the evaporator 7 from flowing through the heater core and to permit all of the air from the evaporator to flow through the cooler air passage 24 fully opened. That is, when a so-called full-cool mode is selected, the opening of the air mix door 9 is set at 0. Conversely, when a so-called full-warm mode is selected, the opening of the air mix door 9 is set at 1 in order to move the air mix door 9 towards the full-open position and consequently to allow all of the air leaving the evaporator 7 to be routed toward the heater core.

In step S2, a test is made to determine whether or not a VENT mode is selected. When the answer to step S2 is affirmative (YES), step S12 proceeds in which a test is made to determine whether a full-cool mode is selected. When the answer to step S12 is affirmative (YES), i.e., in the event that the full-cool mode is selected, step S13 enters in which the by-pass door 10A is fully opened and simultaneously the water valve 25 is fully closed. That is, in the presence of both the VENT mode and the full-cool mode (see the flow from step S2 via step S 12 to step S13), the control unit 15 determines that there is no need for the air temperature control (cold and warm air mixture combination control) and thus the water valve 25 is fully closed with the by-pass door 10A fully opened. Conversely, when the answer to step S12 is negative (NO), step S14 enters in which the by-pass door 10A is fully closed. That is, in the presence of the VENT mode and in the absence of the full-cool mode (see the flow from step S2 via step S12 to step S14), the control unit 15 determines that there is the need for air temperature control or adjustment by means of only the air mix door 9, and thus the bypass door 10A is fully closed so as to maintain the water valve 25 fully opened. When the answer to step S2 is negative (NO), i.e., when the electronic climate control system is turned on in any mode (e.g. a FOOT mode, BI-LEVEL mode or DEFROST mode) except the VENT mode, the control procedure flows from step S2 to step S3 so as to achieve the air temperature control by means of adjustment of the opening of the by-pass door 10A as well as adjustment of the opening of the air mix door 9. In step S3, a target in-car temperature is calculated in a predetermined expression which is properly defined on the basis of a variety of factors, namely characteristics of the cooling/heating system of the vehicle, a mechanical response delay of the air-mix-door linkage connected between the air mix door 9 and the air mix door actuator 18 with respect to changes in the voltage signal value of the air-mix PBR 30 monitoring/sampling the opening of the air mix door, a mechanical response delay of the by-pass door linkage (constructed by the link 43 and the drive arm 41) connected between the by-pass door 10A and the by-pass door actuator 14 with respect to changes in the voltage signal value of the by-pass PBR 31 monitoring/sampling the opening of the by-pass door, and the temperature-control characteristics correlated with the driver-selected discharge mode for example FOOT mode, BI-LEVEL mode, or DEFROST mode. Thereafter, in step S4, a temperature of actual discharged air (a current value of the in-car temperature) is derived and a temperature deviation Sb between the target in-car temperature calculated in step S3 and the actual discharged air temperature (or the current in-car temperature sensed) is calculated as a control parameter in consideration of thermal equilibrium within the vehicle passenger compartment by way of an expression (deviation Sb)= (calculated target in-car temperature)−(actual discharged air temperature). In order to more precisely achieve the temperature control, the deviation SB may be further corrected depending on various characteristics of the heating, ventilation, and air conditioning systems. The control of the bypass-door opening, executed as one discharged-air temperature control, is based on the calculated temperature deviation Sb. Actually, in step S5, the deviation Sb is compared with a predetermined upper threshold such as +2° C., and also compared with a predetermined lower threshold such as −2° C. In case of Sb>+2° C., that is, when the in-car temperature sensed is less than the target in-car temperature, step S9 proceeds in which the by-pass door actuator 14 is energized to move the by-pass door 10A towards its fully closed position, thereby resulting in movement of the water valve 25 towards its full-open position. In case of |Sb|<2° C. (−2° C.≦Sb≦+2° C.), that is, when the in-car temperature sensed is almost equivalent to the target in-car temperature, step S6 proceeds in which the control unit 15 derives the current value of the opening of the by-pass door from the voltage signal from the bypass-door PBR 31. The current value of the opening of the by-pass door will be hereinafter abbreviated simply to "current bypass-door opening" and denoted by "Xb". In step S6, a test is made to determine whether the derived current bypass-door opening Xb is greater than or equal to a first predetermined value (0.99). In case of Xb≧0.99, the procedure flows from step S6 to step S9 to fully close the by-pass door 10A, and as a result the water valve 25 is shifted to its full-open position. When the answer to step S6 is negative, i.e., in case of Xb<0.99, step S10 proceeds in which the by-pass door actuator is de-energized to hold the current position of the by-pass door 10A. In case of Sb<−2° C., that is, when the in-car temperature sensed exceeds the target in-car temperature, step S7 proceeds in which the same test as executed in step S6 is made to determine whether the derived current bypass-door opening Xb is above the first predetermined value (0.99). In case of Xb>0.99 in step S7, the procedure flows from step S7 to step S9 to fully close the by-pass door 10A and as a result the water valve 25 is shifted to its full-open position. When the answer to step S7 is negative, i.e., in case of Xb<0.99 in step S7, step S8 enters in which the current bypass-door opening Xb is further compared with a second predetermined value (0.85). In case that the current bypass-door opening Xb, continuously derived by the control unit every sampling time intervals, is less than the first predetermined value (0.99) and greater than the second predetermined value (0.85), i.e., in case of 0.85<Xb<0.99, the procedure flows from step S8 to step S10 so as to retain the position of the by-pass door 10A unchanged. Therefore, in the event that the condition of Sb<−2° C. {(the in-car temperature sensed)>(the target in-car temperature)} continues for a while and as a result the bypass-door opening Xb exceeds the second predetermined value (0.85) and is gradually approaching nearer to the first predetermined value (0.99) substantially equivalent to the full-open position of the by-pass door 10A, the control unit 15 operates to de-energize the by-pass door actuator 14 so as to prevent the pivotal movement of the by-pass door 10A towards the full-open position and to hold the angular position of the bypass door at a partially-opened position slightly apart from the full-open position of the by-pass door and simultaneously to hold the water valve 25 at an opened position offset from the fully-closed position of the water valve. As set out above, even when the condition of Sb<−2° C. {(the in-car temperature sensed)>(the target in-car temperature)} continues for a while, the water valve, mechanically linked to the by-pass door actuator, remains opened fully or partially depending upon comparison results of the current bypass-door opening Xb with both the first and second predetermined values (0.99 and 0.85), thus permitting hot engine coolant flow through the heater core via the water valve 25 opened, in BI-LEVEL mode for example. In contrast to the above, when the answer to step S8 is affirmative, i.e., in case of Xb≦0.85, the procedure flows from step S8 to step S11 in which the bypass door 10A is shifted towards the full-open position, until the current bypass-door opening Xb reaches the second predetermined value or opening (0.85). The arithmetic proceeding, composed of steps S1 through S14 shown in FIG. 4, is repeatedly executed as time-triggered interrupt routines to be triggered every predetermined sampling time intervals, so that the in-car temperature sensed is adjusted towards the target in-car temperature. Therefore, in the previously-noted climate control system made according to the invention, even when the by-pass door 10A opens during air temperature control, the water valve 25 is kept opened but not completely closed, thus allowing hot engine coolant flow through the heater core and consequently permitting the discharge air (warm air) from the heater unit. Briefly speaking, the electronic climate control system of the embodiment functions to move the by-pass door 10A towards the closed position by means of step S7 of FIG. 4 in order to prevent the water valve 25 from being fully closed in case that the bypass-door opening Xb exceeds the first predetermined value such as 0.99 and the angular position of the by-pass door 10A is nearly equal to the full-open position during the air temperature control based on the temperature deviation Sb. Additionally, in case of 0.85<Xb<0.99 during the air temperature control, the electronic climate control system of the embodiment functions to prevent a further pivotal movement of the by-pass door 10A towards the full-open position by way of the flow from step S7 via step S8 to step S10 in order to prevent the water valve 25 to be completely closed.

In the embodiment, although both the first and second predetermined values such as 0.99 and 0.85 are used as upper and lower limits necessary for the opening control of the by-pass door, the first and second predetermined values may be properly modified in consideration of a time constant or lag coefficient of the heating, ventilation, air conditioning systems and/or a mechanical response-delay of the linkage provided between the by-pass door 10A and the by-pass door actuator 14.

As will be appreciated from the above, the climate control system of the invention can easily provide an optimal control of the opening of the water valve 25 as well as the opening of the by-pass door 10A by properly changing only the bypass-door opening control procedure programmed into the control unit 15, without changing any mechanism of the by-pass door actuator which is common to the by-pass door and the water valve. Furthermore, in the improved climate control system of the invention, when the climate control system is turned on in a predetermined discharge mode (including at least a BI-LEVEL mode and a DEFROST mode) except a VENT mode, the climate control system determines that the air temperature control is required, and additionally the system restricts or limits the bypass-door opening to a value less than a maximum opening equivalent to its full-open position, sampling/monitoring the bypass-door opening Xb. Therefore, during the predetermined discharge mode, since the system functions such that the by-pass door is not shifted to the full-open position and thus the water valve is not closed even when the opening motion of the by-pass door is continued for a while, engine-coolant supply toward within the heater core can be continued with the water valve opened, thus maintaining both the cool air flow discharged from ventilation ducts or nozzles and the warm air flow discharged from another discharge outlets such as defrost nozzles or ducts or foot vents. As explained above, in the case that the predetermined discharge mode is an air temperature control mode such as a DEFROST mode, a BI-LEVEL mode and the like, the restriction or limitation of the bypass-door opening as set out above can ensure more precisely temperature-controlled air flow from respective discharge outlets, irrespective of the use of a single actuator which is common to the bypass door and the water valve.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An electronic climate control system for an automotive vehicle comprising:

a by-pass passage for delivering cool air flowing through an evaporator core directly to a discharged-air ventilator;

a by-pass door provided at a communication inlet of said by-pass passage, for adjusting a flow rate of cool air through said by-pass passage;

a hot-water valve provided for adjusting a flow rate of hot coolant to a heater core;

an actuator, mechanically linked directly to both said by-pass door and said hot-water valve, for adjusting a bypass-door opening and a water-valve opening so as to fully close said hot-water valve when said by-pass door is fully opened;

switching means for selecting one of discharged-air outlet modes;

detection means for monitoring the bypass-door opening; and control means configured to be electronically connected to said actuator for automatically limiting the bypass-door opening to a predetermined value less than a maximum opening, which is equivalent to a full-open position of said by-pass door, when a predetermined discharged-air outlet mode is selected by said switching means.

2. The electronic climate control system as set forth in claim 1, wherein said predetermined discharged-air outlet mode is an air temperature control mode based on a temperature deviation between an actual in-car temperature and a target in-car temperature, and said control means prevents the bypass-door opening from reaching said maximum opening when said air temperature control mode is selected.

3. An electronic climate control system for an automotive vehicle comprising:

a by-pass passage for delivering cool air flowing through the evaporator core directly to a discharged-air ventilator;

a by-pass door provided at a communication inlet of said by-pass passage, for adjusting a flow rate of cool air through said by-pass passage;

a hot-water valve provided for adjusting a flow rate of hot coolant to a heater core;

an actuator being common to said by-pass door and said hot-water valve, for adjusting a bypass-door opening and a water-valve opening, said actuator having a drive arm mechanically linked directly to both said by-pass door and said hot-water valve so that an operating range of said by-pass door is wider than an operating range of said hot-water valve, and so that the operating range of said hot-water valve is embraced in the operating range of said by-pass door, and so that said by-pass door is shifted from a fully-closed position to a full-open position when shifting from a first angular position of said drive arm to a second angular position of said drive arm and that said hot-water valve is shifted from a full-open position to a fully-closed position when shifting from a third angular position defined between said first and second angular positions to said second angular position;

switching means for selecting one of discharged-air outlet modes;

detection means for monitoring said bypass-door opening; and control means configured to be electronically connected to said actuator for automatically limiting the bypass-door opening to a predetermined value less than a maximum opening, which is equivalent to a full-open position of said by-pass door, when a predetermined discharged-air outlet mode is selected by said switching means.

4. The electronic climate control system as set forth in claim 3, wherein said predetermined discharged-air outlet mode is an air temperature control mode based on a temperature deviation (Sb) between an actual in-car temperature and a target in-car temperature, and said control means prevents the bypass-door opening from reaching said maximum opening and prevents said hot-water valve from being fully closed when said air temperature control mode is selected.

5. The electronic climate control system as set forth in claim 4, wherein said control means comprises a comparison means for comparing the bypass-door opening with upper and lower limits defining a predetermined door opening range less than and close to the maximum opening, and said control means maintains the bypass-door opening within the predetermined door opening range during the air temperature control mode by energizing said actuator to shift said by-pass door toward the full-open position when the bypass-door opening detected by said detection means is below the lower limit, by energizing said actuator to shift said by-pass door toward a fully-closed position when the bypass-door opening detected by said detection means is above the upper limit, and by de-energizing said actuator when the bypass-door opening detected by said detection means is within the predetermined door opening range.

6. The electronic climate control system as set forth in claim 1, further comprising:

a cooler air passage arranged parallel to the heater core for delivering cool air flowing through the evaporator core to an air mix chamber;

an air mix door pivotally provided in said cooler air passage for controlling a blend of evaporator core air and heater core air delivered to the air mix chamber, wherein said by-pass passage bypasses said cooler air passage and said switching means selects a temperature control mode, which is based on a temperature deviation from a target in-car temperature, from the discharged-air outlet modes.

7. The electronic climate control system as set forth in claim 1, wherein the control means limits the by-pass door opening to a value contained within a predetermined door opening range less than and close to the maximum opening to hold the bypass-door opening within the predetermined door opening range and to hold said hot-water valve partly opened when the air temperature control mode is selected.

8. The electronic climate control system as set forth in claim 3, further comprising:

a cooler air passage arranged parallel to the heater core for delivering cool air flowing through the evaporator core to an air mix chamber;

an air mix door pivotally provided in said cooler air passage for controlling a blend of evaporator core air and heater core air delivered to the air mix chamber, wherein said by-pass passage bypasses said cooler air passage and said switching means selects a temperature control mode, additionally based on a temperature deviation from a target in-car temperature, from the discharged-air outlet modes.

9. The electronic climate control system as set forth in claim 3, wherein the control means limits the by-pass door opening to a value contained within a predetermined door opening range less than and close to the maximum opening to hold the bypass-door opening within the predetermined door opening range and to hold said hot-water valve partly opened when the air temperature control mode is selected.

10. An electronic climate control system for an automotive vehicle comprising:

a by-pass passage for delivering cool air flowing through an evaporator core directly to a discharged-air ventilator;

a by-pass door provided at a communication inlet of said by-pass passage, for adjusting a flow rate of cool air through said by-pass passage;

a hot-water valve provided for adjusting a flow rate of hot coolant to a heater core;

an actuator, mechanically linked directly to both said by-pass door and said hot-water valve, for adjusting a bypass-door opening and a water-valve opening so as to fully close said hot-water valve when said by-pass door is fully opened;

a cooler air passage arranged parallel to the heater core for delivering cool air flowing through the evaporator core to an air mix chamber;

an air mix door pivotally provided in said cooler air passage for controlling a blend of evaporator core air and heater core air delivered to the air mix chamber;

switching means for selecting one of discharged-air outlet modes;

detection means for monitoring the bypass-door opening; and control means configured to be electronically connected to said actuator for automatically limiting the bypass-door opening to a value contained within a predetermined door opening range less than and close to a maximum opening, which is equivalent to a full-open position of said by-pass door, to hold the bypass-door opening within the predetermined opening range and to hold said hot-water valve partly opened when said switching means selects an air temperature control mode, which is based on a temperature deviation from a target in-car temperature, from the discharged-air outlet modes.

* * * * *